(12) United States Patent
Zhang et al.

(10) Patent No.: US 8,917,621 B2
(45) Date of Patent: Dec. 23, 2014

(54) METHOD AND APPARATUS FOR OBTAINING FEEDBACK DELAY

(71) Applicant: Huawei Technologies Co., Ltd., Shenzhen, Guangdong (CN)

(72) Inventors: Jinfang Zhang, Shanghai (CN); Haihua Shen, Shanghai (CN); Gang Huang, Shanghai (CN); Wenliang Liang, Shanghai (CN); Bojie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 13/715,349

(22) Filed: Dec. 14, 2012

(65) Prior Publication Data

US 2013/0170372 A1    Jul. 4, 2013

Related U.S. Application Data

(63) Continuation of application No. PCT/CN2012/076026, filed on May 25, 2012.

(30) Foreign Application Priority Data

Dec. 28, 2011 (CN) .......................... 2011 1 0447835

(51) Int. Cl.
G01R 31/08 (2006.01)
H04W 24/02 (2009.01)
H04L 1/18 (2006.01)

(52) U.S. Cl.
CPC ............. H04W 24/02 (2013.01); H04L 1/1854 (2013.01); H04L 1/1812 (2013.01)
USPC ........................................................ 370/252

(58) Field of Classification Search
USPC ......... 370/280, 252, 336, 331, 241, 254, 345, 370/350; 714/748, E11.001, E11.113, 751; 455/451

See application file for complete search history.

(56) References Cited

U.S. PATENT DOCUMENTS

2004/0057543 A1   3/2004 Huijgen et al.
2008/0109693 A1*  5/2008 Maas et al. .................... 714/748

(Continued)

FOREIGN PATENT DOCUMENTS

CN   101080031 A   11/2007
CN   101136688 A   3/2008

(Continued)

OTHER PUBLICATIONS

International Search Report and Written Opinion of the International Searching Authority dated Oct. 18, 2012 in connection with International Patent Application No. PCT/CN2012/076026.

*Primary Examiner* — Phuongchau Ba Nguyen

(57) ABSTRACT

A method for obtaining feedback delay includes: obtaining a target time elapsed in a process from when a remote radio end receives uplink data sent from a user end to when the remote radio end sends out feedback information responsive to the uplink data to the user end, wherein the feedback information responsive to the uplink data is fed back by a processing node to the remote radio end; calculating a feedback delay by adding the target time and an air interface transmission propagation delay, wherein the air interface transmission propagation delay is a transmission time of the uplink data from the user end to the remote radio end; and configuring, by the processing node, an uplink hybrid automatic repeat request (HARQ) ACK/NACK feedback interval to be the feedback delay.

10 Claims, 5 Drawing Sheets

(56) References Cited

U.S. PATENT DOCUMENTS

| | | |
|---|---|---|
| 2010/0199141 A1 | 8/2010 | Parkvall et al. |
| 2010/0246478 A1* | 9/2010 | Liu et al. .................. 370/315 |
| 2012/0039260 A1* | 2/2012 | Song et al. ................ 370/328 |
| 2013/0170372 A1* | 7/2013 | Zhang et al. .............. 370/252 |

FOREIGN PATENT DOCUMENTS

| | | |
|---|---|---|
| CN | 101399645 A | 4/2009 |
| CN | 101674589 A | 3/2010 |
| CN | 101841935 A | 9/2010 |
| WO | WO 2004/030241 A1 | 4/2004 |

* cited by examiner

METHOD AND APPARATUS FOR OBTAINING FEEDBACK DELAY

CROSS-REFERENCE TO RELATED APPLICATIONS

This application is a continuation of International Application No. PCT/CN2012/076026, filed May 25, 2012, titled "FEEDBACK DELAY OBTAINING METHOD, APPARATUS, AND SYSTEM" which claims priority to Chinese Patent Application No. 201110447835.8, filed Dec. 28, 2011 and titled "FEEDBACK DELAY OBTAINING METHOD, APPARATUS, AND SYSTEM", both of which are incorporated herein by reference in their entireties.

TECHNICAL FIELD

The present disclosure relates to the field of communication systems, and in particular, to a method and apparatus for obtaining feedback delay.

BACKGROUND

Compared with a conventional base station, a whole system of a distributed base station using remote radio technologies is divided into a baseband processing unit (BBU) and a remote radio unit (RRU). The RRU is placed at an access point far away from the BBU, the RRU and the BBU are connected through an optical fiber, and a baseband radio signal is transmitted in an analogue or digital manner.

Recently, a radio access network system based on a cloud computing technology, C-RAN (cloud RAN) gradually draws wide attention of the industry. In centralized access network architecture of the C-RAN, baseband signals of multiple RRUs are transmitted to a centralized BBU computing center through a transport network. The baseband signals are processed in the centralized BBU computing center so as to obtain benefits of statistical multiplexing and joint processing of computing resources, which puts forward a very high demand for a transmission bandwidth of the transport network. To effectively reduce the data transmission bandwidth demand of the RRU and the BBU computing center, a pair of compressing/decompressing modules may be deployed between the RRU and the BBU computing center. The baseband signal transmitted between the RRU and the BBU computing center is compressed at one end (e.g., local end), and after being transmitted through the transport network, the compressed signal is restored at a peer end, thereby greatly reducing the transmission cost of the network. Because additional delays are introduced due to operations such as compression/decompression and network transmission, these delays affect a process which has a high requirement for a round-trip delay in the system.

In the whole system, two processes which have the highest requirement for the delay are a random access process and a hybrid automatic repeat request process. Because window length of a random access response is settable, a delay of the random access process is easy to be satisfied. However, for a delay of the hybrid automatic repeat request process, additional delays introduced due to the compression/decompression, the network transmission and so on affect a feedback time for feedback information of uplink data, thereby causing timing sequence chaos for a hybrid automatic repeat request (HARQ) and unnecessary retransmission.

SUMMARY

Embodiments of the present invention provide a method and apparatus for obtaining feedback delay, which solve a problem that an additional delay is introduced due to the factors, for example, compression/decompression and network transmission, and thereby causing timing sequence chaos for HARQ and unnecessary retransmission.

An embodiment of the present invention provides a method for obtaining feedback delay, including:

obtaining, by a processing node, a target time elapsed in a process from that a remote radio end receives uplink data sent from a user end to that the remote radio end sends out feedback information responsive to the uplink data to the user end, wherein the feedback information responsive to the uplink data is fed back by the processing node to the remote radio end, and the feedback information is information about whether the processing node successfully receives the uplink data sent by the user end;

calculating, by the processing node, a feedback delay by adding the target time and an air interface transmission propagation delay, wherein the air interface transmission propagation delay is a transmission time of the uplink data from the user end to the remote radio end; and configuring, by the processing node, an uplink hybrid automatic repeat request (HARQ) ACK/NACK feedback interval to be the feedback delay.

Another embodiment of the present invention provides an apparatus, which includes:

a processor; and a non-transitory computer readable storage medium storing programming for execution by the processor, the programming including instructions to:

obtain a target time elapsed in a process from that a remote radio end receives uplink data sent from a user end to that the remote radio end sends out feedback information responsive to the uplink data to the user end, wherein the feedback information responsive to the uplink data is fed back by the apparatus to the remote radio end, and the feedback information is information about whether the apparatus successfully receives the uplink data sent by the user end;

calculate a feedback delay by adding the target time and an air interface transmission propagation delay, wherein the air interface transmission propagation delay is a transmission time of the uplink data from the user end to the remote radio end; and configure an uplink hybrid automatic repeat request (HARQ) ACK/NACK feedback interval to be the feedback delay.

A further another embodiment of the present invention provides a method for obtaining feedback delay, which includes:

obtaining, by a processing node, a transmission time of downlink detection data which is sent from the processing node to a remote radio end on a subframe on which no downlink data is sent to the remote radio end;

obtaining, by the processing node, after receiving uplink detection data sent on a downlink subframe by the remote radio end, a transmission time of the uplink detection data from the remote radio end to the processing node;

instructing, by the processing node, the remote radio end to feed back a time required for processing the uplink detection data and the downlink detection data at the remote radio end;

receiving, by the processing node, the time required for processing the uplink detection data and the downlink detection data at the remote radio end, from the remote radio end;

calculating, by the processing node, a feedback delay according to the transmission time of the uplink detection data, the transmission time of the downlink detection data and the time required for processing the uplink detection data and the downlink detection data at the remote radio end; and configuring an uplink hybrid automatic repeat request (HARQ) ACK/NACK feedback interval to be the feedback delay.

Still further another embodiment of the present invention provides an apparatus, which includes:

a processor; and a non-transitory computer readable storage medium storing programming for execution by the processor, the programming including instructions to:

obtain a transmission time of downlink detection data which is sent from the apparatus to a remote radio end on a subframe on which no downlink data is sent to the remote radio end;

obtain, after receiving uplink detection data sent on a downlink subframe by the remote radio end, a transmission time of the uplink detection data from the remote radio end to the apparatus;

instruct the remote radio end to feed back a time required for processing the uplink detection data and the downlink detection data at the remote radio end;

receive the time required for processing the uplink detection data and the downlink detection data at the remote radio end, from the remote radio end;

calculate a feedback delay according to the transmission time of the uplink detection, the transmission time of the downlink detection data and the time required for processing the uplink detection data and the downlink detection data at the remote radio end; and configure an uplink hybrid automatic repeat request (HARQ) ACK/NACK feedback interval to be the feedback delay.

In at least some embodiments of the present invention, the processing node obtains the delay in the process from that the user end sends the uplink data to that the remote radio end sends the feedback information of the uplink data to the user end, so that this may solve the problem that the additional delay is introduced due to the compression/decompression and the network transmission and thereby causing timing sequence chaos for the HARQ and increasing unnecessary retransmission in a transmission process of uplink service data of the user end.

BRIEF DESCRIPTION OF THE DRAWINGS

To illustrate the technical solutions in the embodiments of the present invention more clearly, accompanying drawings needed to be used in description of the embodiments or the prior art are briefly introduced below. Obviously, the accompanying drawings in the following description are merely some embodiments of the present invention, and persons of ordinary skill in the art may further obtain other accompanying drawings according to these accompanying drawings without making creative efforts.

DETAILED DESCRIPTION

In order to make the objectives, technical solutions and advantages of the present invention clearer, the present invention is hereinafter described in detail with reference to the accompanying drawings and embodiments. The exemplary embodiments and descriptions of the embodiments of the present invention are used to illustrate the present invention, but the present invention is not limited thereto.

Figure 1:
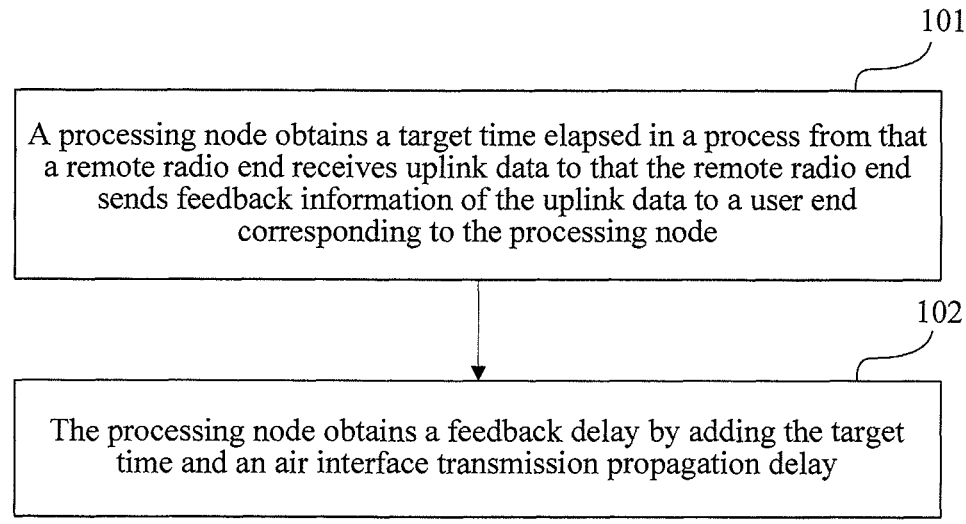
FIG. 1 is a flow chart of a method for obtaining feedback delay according to an embodiment of the present invention.

An embodiment of the present invention provides a method for obtaining feedback delay, as shown in FIG. 1, the method includes:

101: A processing node obtains a target time elapsed in a process from when a remote radio end receives uplink data to when the remote radio end sends feedback information of the uplink data to a user end corresponding to the processing node.

Specifically, the target time is a sum of delays of intermediate radio frequency processing and compression at the remote radio end, a transmission propagation delay of the uplink data over a transport network, delays of uplink data decompression, protocol stack processing, decoding processing, downlink data compression and encoding processing at the processing node, a transmission propagation delay of downlink data over the transport network, and delays of depression and intermediate radio frequency processing at the remote radio end. The delay of the intermediate radio frequency processing depends on a hardware capability of the remote radio end; the delays of protocol stack processing, encoding processing and decoding processing depend on a software and hardware processing capability of the processing node; and these delays are relatively fixed. The delays of compression and decompression depend on an algorithm and implementation of compression/decompression module; the transmission propagation delays of uplink data and downlink data over the transport network depend on an amount of compressed data, network bandwidth, capability of the network device, network topology and so on; and these delays are affected by the algorithm and a network change. A transmission delay between every two transmission nodes depends on the amount of data transmitted between the two transmission nodes, a transmission bandwidth and a granularity (e.g., unit) of data processed by a data recipient. If the data processing granularity of a transmission peer node is a data packet, the transmission delay is the time used for transmitting a data packet, namely, data packet length/a transmission bandwidth; and if the data processing granularity of the transmission peer node is data of a subframe, the transmission delay is a data amount/a transmission bandwidth of a compressed subframe. A network device forwarding delay is a product of a forwarding delay of a single switch node and the number of nodes. For the propagation delay, for example, a signal propagation delay in an optical fiber is a product of 5 µs and length of the optical fiber.

The processing node may be a base station, a local computing center, or a centralized computing center, and so on.

The uplink data is sent by the user end, the feedback information of the uplink data is fed back by the processing node, and the feedback information is information about whether the processing node successfully receives the uplink data sent by the user end.

102: The processing node obtains a feedback delay by adding the target time and an air interface transmission propagation delay.

The air interface transmission propagation delay is a transmission delay in a process that the user end sends the uplink data to the remote radio end. The feedback delay is a time elapsed in a process from that the user end sends the uplink data to that the remote radio end sends the feedback information of the uplink data to the user end.

Figure 2:
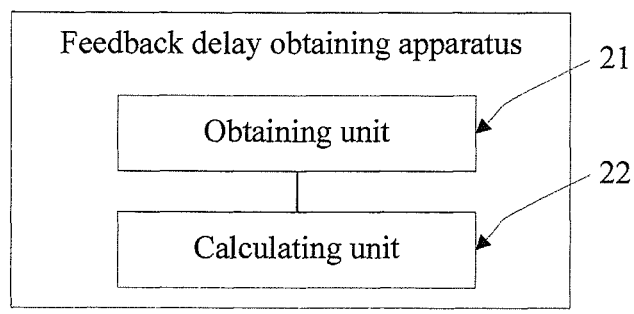
FIG. 2 is a schematic structural diagram of an apparatus for obtaining feedback delay according to an embodiment of the present invention.

An embodiment of the present invention provides an apparatus, and as shown in FIG. 2, the apparatus includes an obtaining unit 21 and a calculating unit 22.

The obtaining unit 21 is configured to obtain a target time elapsed in a process from when a remote radio end receives uplink data to when the remote radio end sends feedback information of the uplink data to a user end.

Specifically, the target time is a sum of delays of intermediate radio frequency processing and compression at the remote radio end, a transmission propagation delay of the uplink data over a transport network, delays of uplink data decompression, protocol stack processing, decoding processing, downlink data compression and encoding processing at the processing node, a transmission propagation delay of downlink data over the transport network, and delays of depression and intermediate radio frequency processing at the remote radio end.

The apparatus for obtaining feedback delay may be, for example, a base station, a local computing center, or a centralized computing center, etc. The uplink data is sent by the user end, the feedback information of the uplink data is fed back by the processing node, and the feedback information is information about whether the processing node successfully receives the uplink data sent by the user end.

The calculating unit 22 is configured to obtain a feedback delay by adding the target time obtained by the obtaining unit 21 and an air interface transmission propagation delay.

The air interface transmission propagation delay is a transmission delay in a process that the user end sends the uplink data to the remote radio end. The feedback delay is a time elapsed in a process from that the user end sends the uplink data to that the remote radio end sends the feedback information of the uplink data to the user end.

Figure 3:
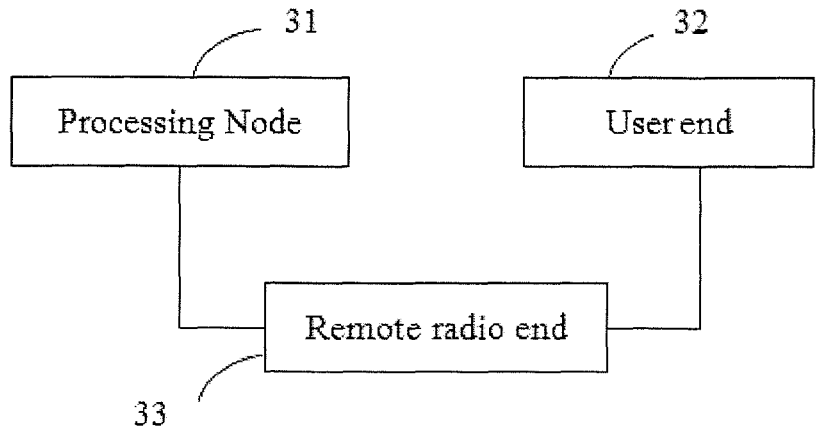
FIG. 3 is a schematic diagram of a system for obtaining feedback delay according to an embodiment of the present invention.

An embodiment of the present invention provides a system for obtaining feedback delay, as shown in FIG. 3, the system includes a processing node 31, a user end 32, and a remote radio end 33.

The processing node 31 is configured to obtain a target time elapsed in a process from when the remote radio end 33 receives uplink data to when the remote radio end 33 sends feedback information of the uplink data to the user end 32 corresponding to the processing node 31.

The user end 32 is configured to send the uplink data to the remote radio end 33.

The remote radio end 33 is configured to send the feedback information of the uplink data to the user end 32.

The processing node 31 is further configured to obtain a feedback delay by adding the target time and an air interface transmission propagation delay.

Specifically, the target time is a sum of delays of intermediate radio frequency processing and compression at the remote radio end, a transmission propagation delay of the uplink data over a transport network, delays of uplink data decompression, protocol stack processing, decoding processing, downlink data compression and encoding processing at the processing node, a transmission propagation delay of downlink data over the transport network, and delays of depression and intermediate radio frequency processing at the remote radio end.

The air interface transmission propagation delay is a transmission delay in a process that the user end 32 sends uplink data to the remote radio end 33. The feedback delay is a time elapsed in a process from that the user end 32 sends the uplink data to a process that the remote radio end 33 sends the feedback information of the uplink data to the user end 32.

Figure 4:
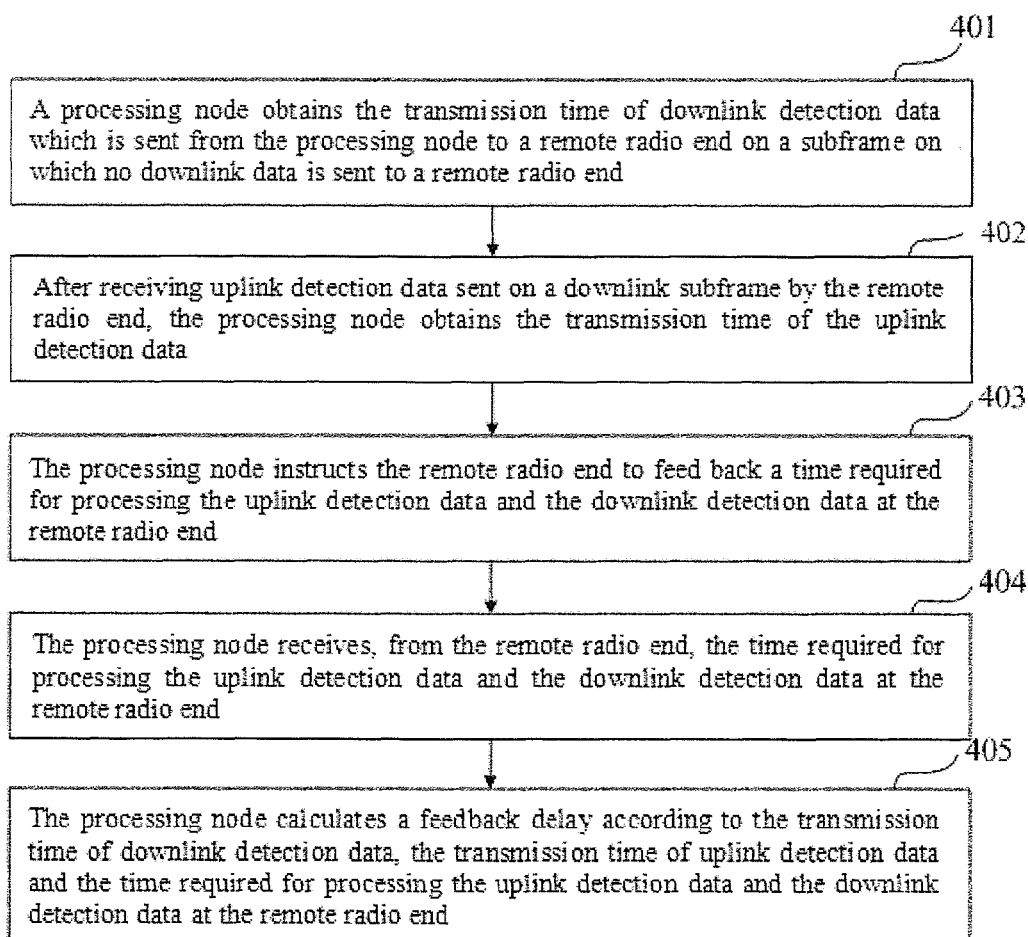
FIG. 4 is a flow chart of another method for obtaining feedback delay according to an embodiment of the present invention.

An embodiment of the present invention provides another feedback delay obtaining method, and as shown in FIG. 4, the method includes:

401: A processing node obtains the transmission time of downlink detection data which is sent from the processing node to a remote radio end on a subframe on which no downlink data is sent to a remote radio end.

402: After receiving uplink detection data sent on a downlink subframe by the remote radio end, the processing node obtains the transmission time of the uplink detection data.

403: The processing node instructs the remote radio end to feed back a time required for processing the uplink detection data and the downlink detection data at the remote radio end.

404: The processing node receives, from the remote radio end, the time required for processing the uplink detection data and the downlink detection data at the remote radio end.

405: The processing node calculates a feedback delay according to the transmission time of downlink detection data, the transmission time of uplink detection data and the time required for processing the uplink detection data and the downlink detection data at the remote radio end.

Specifically, the feedback delay is calculated according to a formula $T=T1+T2+T3$.

T1 is the sum of the transmission time of the uplink detection data and the transmission time of the downlink detection data, T2 is the time required for processing the uplink detection data and the downlink detection data at the remote radio end; T3 is a time required for processing the uplink detection data and the downlink detection data at the processing node; and T is the feedback delay.

Figure 5:
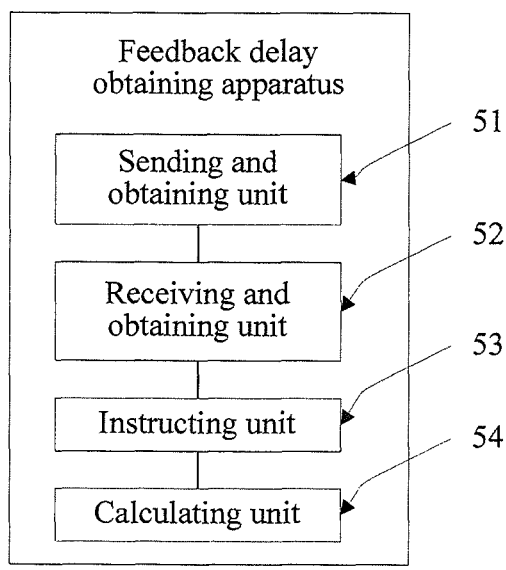
FIG. 5 is a schematic structural diagram of another apparatus for obtaining feedback delay according to an embodiment of the present invention.

An embodiment of the present invention provides another apparatus for obtaining feedback delay, as shown in FIG. 5, the apparatus includes a sending and obtaining unit 51, a receiving and obtaining unit 52, an instructing unit 53, and a calculating unit 54.

The sending and obtaining unit 51 is configured to obtain the transmission time of the downlink detection data which is sent from the processing node to a remote radio end on a subframe on which no downlink data is sent to a remote radio end.

The receiving and obtaining unit 52 is configured to obtain, after receiving uplink detection data sent on a downlink subframe by the remote radio end, the transmission time of the uplink detection data.

The receiving and obtaining unit 52 is further configured to receive, from the remote radio end, a waiting time during which the remote radio end waits to send the uplink detection data, and a time required for processing the uplink detection data and the downlink detection data at the remote radio end.

The instructing unit 53 is configured to instruct the remote radio end to feed back the time required for processing the uplink detection data and the downlink detection data at the remote radio end.

The calculating unit 54 is configured to calculate a feedback delay according to the transmission time of the uplink detection data, the transmission time of the downlink detection data and the time required for processing the uplink detection data and the downlink detection data at the remote radio end.

The calculating unit 54 may be specifically configured to calculate the feedback delay according to a formula T=T1+T2+T3.

T1 is the sum of the transmission time of the uplink detection data and the transmission time of the downlink detection data; T2 is the time required for processing the uplink detection data and the downlink detection data at the remote radio end; T3 is a time required for processing the uplink detection data and the downlink detection data at the processing node; and T is the feedback delay.

Figure 6:
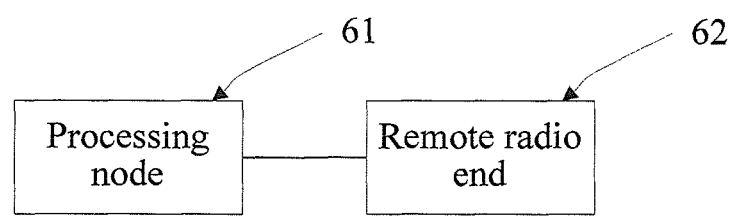
FIG. 6 is a schematic diagram of another system for obtaining feedback delay according to an embodiment of the present invention.

An embodiment of the present invention provides another system for obtaining feedback delay, as shown in FIG. 6, the system includes a processing node 61 and a remote radio end 62.

The processing node 61 is configured to obtain the transmission time of the downlink detection data which is sent from the processing node 61 to the remote radio end 62 on a subframe on which no downlink data is sent to the remote radio end 62.

The processing node 61 is further configured to obtain, after receiving uplink detection data sent on a downlink subframe by the remote radio end 62, the transmission time of the uplink detection data.

The processing node 61 is further configured to calculate a feedback delay according to the transmission time of the uplink detection data, the transmission time of the downlink detection data and the time required for processing the uplink detection data and the downlink detection data at the remote radio end 62.

The processing node 61 may be specifically configured to calculate the feedback delay according to a formula T=T1+T2+T3.

T1 is the sum of the transmission time of the uplink detection data and the transmission time of the downlink detection data; T2 is the time required for processing the uplink detection data and the downlink detection data at the remote radio end 62; T3 is the time required for processing the uplink detection data and the downlink detection data at the processing node 61; and T is the feedback delay.

The remote radio end 62 is configured to feed back, according to an instruction of the processing node 61, the time required for processing the uplink detection data and the downlink detection data at the remote radio end 62.

In some embodiments of the present invention, when the processing node adopts an architecture of a conventional distributed base station or an architecture of a single-layer centralized base station, if a user end service belongs to a high-bandwidth real-time video service or a real-time interaction service, the processing node allocates, to the user end, a feedback delay of feedback information corresponding to uplink data which is sent by the user end. The feedback delay is obtained by the processing node. For other user end services, an allocated feedback delay of feedback information corresponding to the uplink data may be greater than or equal to the feedback delay of the feedback information corresponding to the uplink data of the user end. The feedback delay is obtained by the processing node. For a user end service which does not require very high real-time, when the network is busy, use of a network resource by the user end service may be reduced by increasing the feedback delay of the feedback information corresponding to the uplink data of the user end service, thereby providing more network resources for the user end service which requires high real-time.

When the processing node adopts a layered architecture, the processing node may be formed of a local computing center and a centralized computing center. The user end service is allocated to the centralized computing center or the local computing center to be processed according to principles of maximizing system capacity and balancing calculation capacity. For example, processing in the centralized computing center may be considered as much as possible because a cell edge user is severely interfered. Processing in the local computing center may be preferably considered because interference to a cell center user is small. Meanwhile, division of the user service processing node needs to take calculation capabilities of the local computing center and the centralized computing center into account. For example, part of cell edge user services may be shifted down to the local computing center to be processed due to an inadequate capability of the centralized computing center. Likewise, part of cell center user services may be shifted up to the centralized computing center to be processed due to an inadequate capability of the local computing center. The feedback delay of the feedback information corresponding to uplink data of the user end service, where the feedback delay can be processed by the local computing center, is greater than or equal to a feedback delay that the local computing center can allocate to the user end, and the feedback delay of the feedback information corresponding to uplink data of the user end service, where the feedback delay can be processed by the local computing center, is greater than or equal to a feedback delay that the centralized computing center can allocate to the user end.

Figure 7:
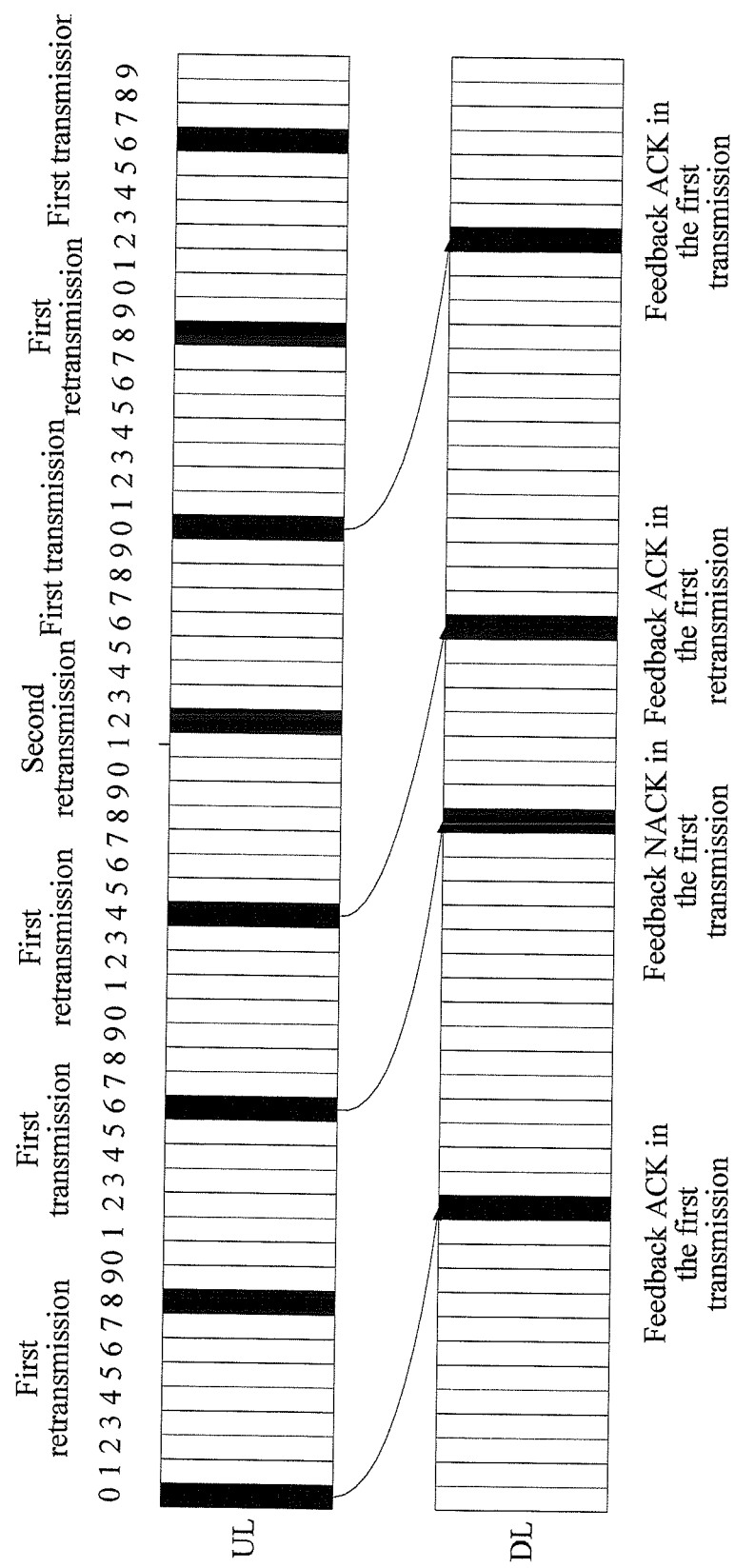
FIG. 7 is an uplink HARQ timing sequence under a frequency division duplex long term evolution system (FDD-LTE system)
Figure 8:
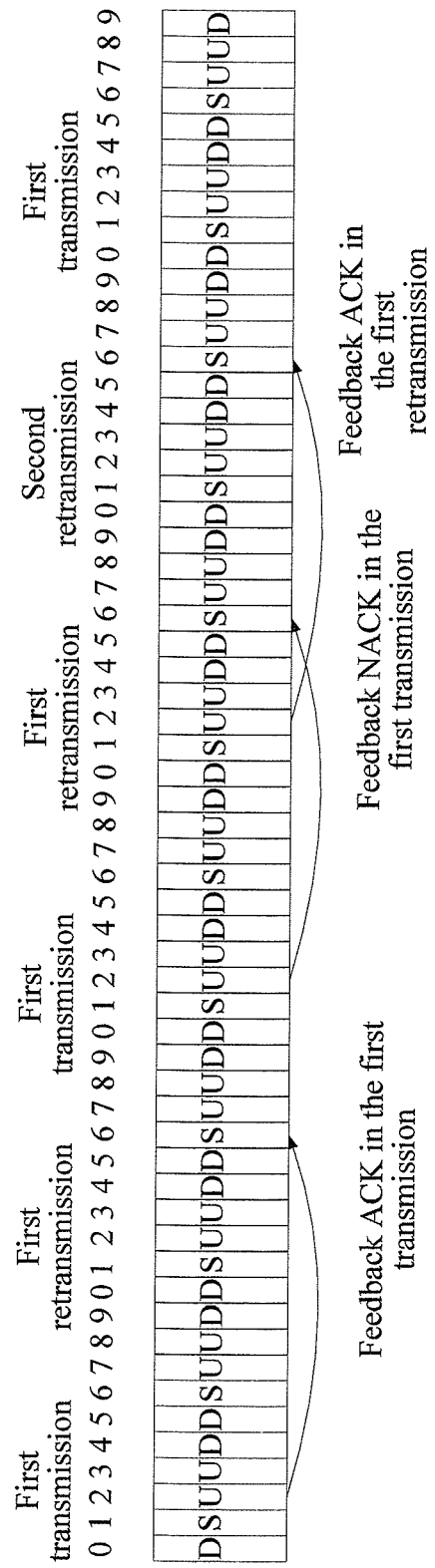
FIG. 8 is an uplink HARQ timing sequence in a time division duplex long term evolution (TDD-LTE) system in which the ratio of uplink subframes to downlink subframes is 2:2.

The method provided in the embodiments of the present invention further has backward compatibility. For example, a processing node performs feedback of the feedback information on first uplink hybrid automatic repeat request HARQ transmission allocation on a feedback time point of first uplink retransmission. For example, in a frequency division duplex long term evolution FDD-LTE system shown in FIG. 7, assume that a feedback delay of feedback information of uplink HARQ is greater than 3 ms and smaller than or equal to 11 ms, uplink data on a subframe 0 of a first frame is allocated on a second subframe of a second frame to be fed back. Because a user end does not receive the feedback of the feedback information at the feedback time of first transmission, namely a forth subframe of the first frame, a HARQ entity considers by default that the feedback information is that the uplink data is not received, and a time frequency resource allocated last time is used to initiate non-adaptive retransmission on an eighth subframe of the first frame. If the first transmission is correct, the processing node directly discards data received in first retransmission without any processing; and if the first transmission is incorrect, the processing node performs the feedback of the feedback information on the first uplink HARQ transmission allocation on the feedback time point of second uplink retransmission, and the rest may be deduced by analogy until the maximum times of retransmission is reached. If the feedback delay of the feedback information of the uplink HARQ is greater, for example, greater than 11 ms, the processing node performs the feedback of the feedback information on the first transmission allocation after a feedback time point of a second or $m^{th}$ (m is smaller than or equal to the maximum times of the retransmission allowed by the system) uplink retransmission. FIG. 8 describes an uplink HARQ timing sequence in a time division duplex long term evolution TDD-LTE system in which a distribution ratio of uplinks to downlinks is 2:2.

The feedback delay obtaining method, apparatus, and system provided in the embodiments of the present invention are applicable to a long term evolution LTE system, but are not limited to the LTE system, and may further be applicable to other systems in which a feedback time point of feedback information is fixed.

According to the feedback delay obtaining method, apparatus, and system provided in the embodiments of the present invention, the processing node obtains the delay in the process from when the user end sends the uplink data to the remote radio end to when the remote radio end sends the feedback information of the uplink data to the user end, thereby solving a problem that an additional delay is introduced due to compression/decompression and network transmission and causes timing sequence chaos for the HARQ and unnecessary retransmission in a transmission process of uplink service data of the user end.

The feedback delay obtaining apparatus and system provided in the embodiments of the present invention may implement the foregoing method embodiments. Reference may be made to the description of the method embodiments for specific function, which are not repeatedly described here. The feedback delay obtaining method, apparatus, and system provided in the embodiments of the present invention may be applicable to the field of communication systems, but are not limited here.

Persons of ordinary skill in the art may understand that all or part of the steps of the method according to the embodiments may be implemented by a computer program instructing relevant hardware. The program may be stored in a computer readable storage medium. When the program is run, the steps of the method according to the embodiments are included. The storage medium may be a magnetic disk, a compact disk, a read-only memory (Read-Only Memory, ROM), or a random access memory (Random Access Memory, RAM), and so on.

The foregoing description is only exemplary embodiments of the present invention, but the protection scope of the present invention is not limited here. Any modification or replacement that may be easily thought of by those skilled in the art without departing from the technical scope disclosed in the present invention shall fall within the protection scope of the present invention. Therefore, the protection scope of the present invention is subject to the claims.

What is claimed is:

1. A method for obtaining a feedback delay, the method comprising:
    obtaining, by a processing node, a target time elapsed in a process from when a remote radio end receives uplink data sent from a user end to when the remote radio end sends out feedback information responsive to the uplink data to the user end, wherein the feedback information responsive to the uplink data is fed back by the processing node to the remote radio end, and the feedback information is information about whether the processing node successfully receives the uplink data sent by the user end, wherein the target time is a sum of:
        delays of an intermediate radio frequency processing and a compression at the remote radio end,
        a transmission propagation delay of the uplink data from the remote radio end to the processing node,
        delays of a decompression of the uplink data received by the processing node, a protocol stack processing, a decoding processing, a downlink data compression and an encoding processing at the processing node,
        a transmission propagation delay of the downlink data from the processing node to the remote radio end, and
        delays of a decompression and an intermediate radio frequency processing at the remote radio end;
    calculating, by the processing node, a feedback delay by adding the target time and an air interface transmission propagation delay together, wherein the air interface transmission propagation delay is a transmission time of the uplink data from the user end to the remote radio end; and
    configuring, by the processing node, an uplink hybrid automatic repeat request (HARQ) ACK/NACK feedback interval to be the feedback delay.

2. The method according to claim 1, wherein the processing node is any one of a base station, a local computing center and a centralized computing center.

3. An apparatus, comprising:
    a processor; and
    a non-transitory computer readable storage medium storing programming for execution by the processor, the programming including instructions to:
    obtain a target time elapsed in a process from when a remote radio end receives uplink data sent from a user end to when the remote radio end sends out feedback information responsive to the uplink data to the user end, wherein the feedback information responsive to the uplink data is fed back by the apparatus to the remote radio end, and the feedback information is information about whether the apparatus successfully receives the uplink data sent by the user end, wherein the target time is a sum of:
        delays of an intermediate radio frequency processing and a compression at the remote radio end,
        a transmission propagation delay of the uplink data from the remote radio end to the apparatus,
        delays of a decompression of the uplink data received by the apparatus, a protocol stack processing, a decoding processing, a downlink data compression and an encoding processing at the apparatus,
        a transmission propagation delay of the downlink data from the apparatus to the remote radio end, and
        delays of a decompression and an intermediate radio frequency processing at the remote radio end;
    calculate a feedback delay by adding the target time and an air interface transmission propagation delay together, wherein the air interface transmission propagation delay is a transmission time of the uplink data from the user end to the remote radio end; and
    configure an uplink hybrid automatic repeat request (HARQ) ACK/NACK feedback interval to be the feedback delay.

4. The apparatus according to claim 3, wherein the apparatus is any one of a base station, a local computing center and a centralized computing center.

5. A method for obtaining a feedback delay, the method comprising:
    obtaining, by a processing node, a transmission time of downlink detection data which is sent from the processing node to a remote radio end on a subframe on which no downlink data is sent to the remote radio end;
    obtaining, by the processing node, after receiving uplink detection data sent on a downlink subframe by the remote radio end, a transmission time of the uplink detection data from the remote radio end to the processing node;
    instructing, by the processing node, the remote radio end to feed back a time required for processing the uplink detection data and the downlink detection data at the remote radio end;

receiving, by the processing node, the time required for processing the uplink detection data and the downlink detection data at the remote radio end, from the remote radio end;

calculating, by the processing node, a feedback delay according to the transmission time of the uplink detection data, the transmission time of the downlink detection data and the time required for processing the uplink detection data and the downlink detection data at the remote radio end; and configuring an uplink hybrid automatic repeat request (HARQ) ACK/NACK feedback interval to be the feedback delay.

6. The method according to claim 5, wherein the processing node calculates the feedback delay according to a formula T=T1+T2+T3, wherein T1 presents a sum of the transmission time of the uplink detection data and the transmission time of the downlink detection data, T2 presents the time required for processing the uplink detection data and the downlink detection data at the remote radio end, T3 presents a time required for processing the uplink detection data and the downlink detection data at the processing node, and T presents the feedback delay.

7. The method according to claim 5, wherein the processing node is any one of a base station, a local computing center and a centralized computing center.

8. An apparatus, comprising:
a processor; and
a non-transitory computer readable storage medium storing programming for execution by the processor, the programming including instructions to:
obtain a transmission time of downlink detection data which is sent from the apparatus to a remote radio end on a subframe on which no downlink data is sent to the remote radio end;
obtain, after receiving uplink detection data sent on a downlink subframe by the remote radio end, a transmission time of the uplink detection data from the remote radio end to the apparatus;
instruct the remote radio end to feed back a time required for processing the uplink detection data and the downlink detection data at the remote radio end;
receive the time required for processing the uplink detection data and the downlink detection data at the remote radio end, from the remote radio end;
calculate a feedback delay according to the transmission time of the uplink detection, the transmission time of the downlink detection data and the time required for processing the uplink detection data and the downlink detection data at the remote radio end; and
configure an uplink hybrid automatic repeat request (HARQ) ACK/NACK feedback interval to be the feedback delay.

9. The apparatus according to claim 8, wherein the feedback delay is calculated according to a formula T=T1+T2+T3, wherein T presents the feedback delay, T1 presents a sum of the transmission time of the uplink detection data and the transmission time of the downlink detection data, T2 presents the time required for processing the uplink detection data and the downlink detection data at the remote radio end, and T3 presents a time required for processing the uplink detection data and the downlink detection data at the apparatus.

10. The apparatus according to claim 8, wherein the apparatus is any one of a base station, a local computing center and a centralized computing center.

* * * * *